United States Patent [19]
Church

[11] 3,824,800
[45] July 23, 1974

[54] AIR CONDITIONING UNIT AND CONTROL

[75] Inventor: Richard A. Church, North Syracuse, N.Y.

[73] Assignee: Carrier Corporation, Syracuse, N.Y.

[22] Filed: Sept. 7, 1973

[21] Appl. No.: 395,081

[52] U.S. Cl.................. 62/186, 236/13, 62/187, 62/208
[51] Int. Cl........................................... F25d 17/04
[58] Field of Search........ 236/13; 62/186, 187, 208

[56] References Cited
UNITED STATES PATENTS

| | | | |
|---|---|---|---|
| 2,828,076 | 3/1958 | Donohue | 236/13 |
| 2,833,298 | 5/1958 | Shannon | 236/13 X |
| 2,906,287 | 9/1959 | Kreuttner | 236/13 X |
| 3,037,702 | 6/1962 | Mauer | 236/13 |
| 3,058,664 | 10/1962 | Donohue | 236/13 |
| 3,117,723 | 1/1964 | Church | 236/87 |
| 3,237,860 | 3/1966 | Jeytoft | 236/13 |
| 3,595,475 | 7/1971 | Morton | 236/101 E |
| 3,610,522 | 10/1971 | Tutt | 236/13 |

*Primary Examiner*—William J. Wye
*Attorney, Agent, or Firm*—J. Raymond Curtin; Barry E. Deutsch

[57] ABSTRACT

An air conditioning unit for supplying conditioned air from a central station into a space to be conditioned to cool the space. The unit includes a device to regulate the quantity of air discharged therefrom. A pressure responsive valve is connected to the device and to the supply duct to provide a control signal to the device, the magnitude of the control signal varying with changes in pressure of the conditioned air in the supply duct to the unit. The unit further includes a thermostat for further varying the control signal supplied to the device, the magnitude of the control signal being varied in accordance with changes of the temperature in the area being conditioned. A suitable control has a normally open port through which conditioned air passes from the supply duct to the pressure responsive valve, and a normally closed port communicating with the thermostat. The normally closed port is opened when the temperature of the conditioned air supplied from the central station exceeds a predetermined value to pass the relatively warm air through the port to the thermostat, the magnitude of the control signal thereafter passing from the pressure responsive valve to the air regulating device being determined solely by the pressure of the conditioned air in the supply duct.

10 Claims, 2 Drawing Figures

PATENTED JUL 23 1974

AIR CONDITIONING UNIT AND CONTROL

BACKGROUND OF THE INVENTION

This invention relates to air conditioning units, and more particularly to a control therefor.

There are many air conditioning units presently known which effectively discharge conditioned air into a space or room requiring conditioned air for the comfort of the occupants thereof. Typically, in installations such as office buildings, schools, and other multi-space buildings, the air is conditioned at a central station and supplied to units provided in each of the rooms or spaces via one or more supply ducts. In many applications, it has been found desirable to maintain the quantity of air discharged from the units relatively constant regardless of any fluctuations in the supply air pressure. A unit that has proven to be particularly satisfactory in achieving the foregoing is disclosed in U.S. Pat. No. 3,117,723, assigned to the same assignee as the assignee hereof.

Although the air conditioning unit disclosed in the abovecited U.S. Pat. can deliver a relatively constant quantity of conditioned air regardless of changes in the supply air pressure, there are many applications in which it may be desirable to reduce the quantity of air discharged from a unit in accordance with variations in changes in the temperature of the space being served thereby. Accordingly, many of the units include a thermostat for sensing the temperature of the air and for further providing a control signal to the air quantity regulating means of the unit to reduce the quantity of air delivered therefrom as the temperature of the space approaches a desired level.

The air discharged from each of the units compensates for heat developed in the various areas served thereby from among any or all of the following: lights, electric machines, occupants, and solar heat developed via radiation and conduction.

Usually, during the evening hours, such spaces are unoccupied and the cooling load therein becomes almost negligible due to elimination of almost all the heat producing elements. However, even those units having thermostats, generally continue to discharge a minimal amount of conditioned air into the rooms, thereby lowering the temperature to a level which may be uncomfortably cool for the occupants initially entering such rooms the following day.

Additionally, many multi-office buildings are substantially unoccupied during weekends and holidays. Very often, the central refrigeration plant for the air conditioning system is shut down, thereby eliminating the flow of conditioned air from the units. However, overcooling of the various spaces may still occur via transmission losses to the outside through the skin of the building.

To compensate for such overcooling, some systems employing units of the type heretofore discussed, have included warm-up switches. Before the occupants are due to arrive, the central station equipment, instead of cooling the air, warms the air to a relatively high temperature level before it is delivered to the various rooms. The warm-up switch senses the flow of the relatively warm air in the supply duct and overrides the normal thermostatic control to deliver the maximum quantity of air from thhe unit in accordance with predetermined levels. Thus, the temperature level in the rooms may be readily and rapidly increased to satisfactory levels before the occupants thereof arrive, eliminating occupant dissatisfaction due to excessively low temperature levels.

The addition of the warm-up switches have heretofore substantially increased the cost of the air conditioning unit and controls therefor. Accordingly, some units have not utilized warmup switches, thereby creating occupant discomfort.

SUMMARY OF THE INVENTION

It is therefore an object of the invention to provide a control for an air conditioning unit operating to override the normal thermostat control to deliver a maximum quantity of conditioned air from the unit when warm air is supplied from a central station.

It is a further object of this invention to reduce the cost of providing a warm-up control.

It is yet another object of this invention to provide an air conditioning unit including a device operable to override a normal thermostatic control when the conditioned air is supplied at a relatively warm temperature level.

These and other objects of the present invention are obtained by providing an air conditioning unit for supplying conditioned air into a space to be conditioned and having means to regulate the quantity of air discharged from the unit. A pressure responsive valve is connected to the air regulating means and to the supply duct to provide a control signal to the air regulating means, the magnitude of the control signal varying with changes in pressure of the conditioned air in the supply duct. Thermostatic means for sensing the temperature of the air in the area being conditioned and for further varying the magnitude of the control signal supplied to the air regulating means operates to decrease the quantity of conditioned air supplied from the unit as the temperature of the area approaches a predetermined value. Means are connected to the thermostatic means and to the pressure responsive valve, the means including a normally open port through which conditioned air passes from the conditioned air supply duct to the pressure responsive valve, and a normally closed port communicating with the thermostatic means, the normally closed port opening when the temperature of the conditioned air supplied from the central station exceeds a predetermined value. The warm air passes through the port to the thermostatic means, so that the magnitude of the control signal from the pressure responsive valve to the air regulating means is determined solely by the pressure of the conditioned air in the supply duct.

DESCRIPTION OF THE PREFERRED EMBODIMENT

Figure 1:
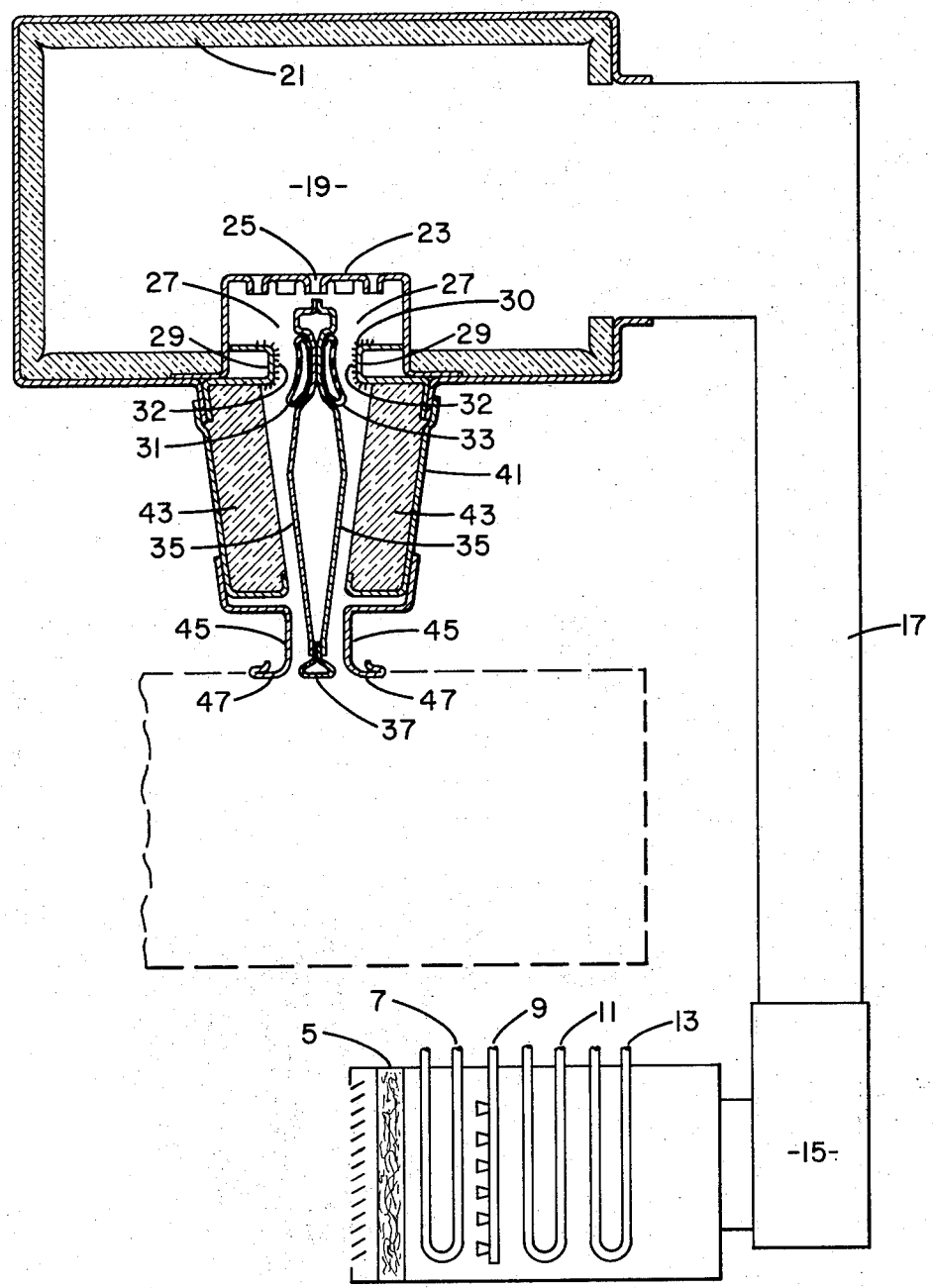
FIG. 1 is a schematic view of a portion of an air conditioning system illustrating in section an air conditioning unit of a type to which the present invention relates.

Referring more particularly to the drawing, there is illustrated a central air conditioning apparatus including a filter 5, precooling coil 7, spray means 9, cooling coil 11, heating coil 13 and a fan 15, for heating, cooling, humidifying and filtering the air as desired, to provide conditioned air for passage to the area being conditioned. A supply air duct 17 is illustrative o a plurality of ducts provided to supply conditioned air to the air conditioning units disposed throughout the building.

In the preferred embodiment, the air conditioning unit or terminal is illustrated as a ceiling air terminal. However, it should be specifically understood that other types of air conditioning units, for example but not to be limited to, induction units of a type well known to those familiar in the art, may be employed in lieu of the ceiling terminal hereinafter described in detail.

The ceiling terminal includes a primary chamber 19 lined with a sound absorbing material 21 such as a glass fiber blanket. The primary chamber is ordinarily open at both ends for connecting a series of terminals end to end to provide a complete air discharge system. Suitable end pieces (not shown) are utilized to cap the end terminals in the series. An air supply distribution plate 23 having a plurality of collared openings 25 therein is provided to evenly distribute supply air from primary chamber 19 into distribution chamber 27 which is defined by the top and side walls of distribution plate 23. To provide an optimum air discharge pattern, the air supplied to the distribution chamber from the primary chamber should have minimal non-vertical velocity components. The collars divert the horizontal velocity component of the air stream from primary chamber 19 so the velocity components of the air stream in distribution chamber 27 are vertical.

The bottom of distribution chamber 27 includes aligned cutoff plates 29 which are provided with curved surface 30 for engagement by bladders 31 and 33 to form a damper or control chamber. The curved surfaces smooth the flow of air through the damper to minimize the pressure drop therethrough when the bladder is fully deflated to provide a low noise level over the entire operating range of the terminal as bladder inflation is varied between a fully deflated position and a fully inflated position. Surface 30 is covered with felt 32 to further minimize noise.

By varying the inflation of the baldders, the area of the opening between the bladders and the cutoff plates may be varied. This feature can be utilized to provide a variety of modes of terminal operation. If it is desired to maintain a constant discharge of air from the terminal, a pressure responsive control 51, illustrated in FIG. 2, may be employed to inflate or deflate the bladders in response to supply air pressure to reduce the area between the bladders and cutoff plates as duct pressure increases and to increase the area therebetween as duct pressure decreases. If it is desired to control the terminal to provide a constant room temperature under varying cooling loads, the bladder inflation may be further controlled by a thermostat 90, illustrated in FIG. 2, responsive to room temperature to provide an increased quantity of air flow from the terminal as the cooling load increases and a decreased quantity of air flow from the terminal as the cooling load decreases.

Bladders 31 and 33 are adhesively mounted on a central partition assembly comprised of opposed generally convex plates 35, diffuser triangle 37 and control module 39. The plates have a V-shaped recess therein so the bladders are completely recessed within the plates when deflated. This provides a large area between the active walls of the bladders and the cutoff plates for maximum air flow therebetween. Further, the recessed bladder provides a smooth surface along plate 35 too minimize air turbulence.

The damper mechanism is disposed a substantial distance upstream from the discharge opening in the terminal to provide sufficient space therebetween to absorb any noise generated by the damper mechanism. For maximum sound absorption, downwardly extending walls 41 which form air passages in conjunction with paltes 35 are lined with sound absorbing material such as glass fiber blankets 43. Outlet members 45 having outwardly flared lower portions 47 thereof are affixed, as by welding, to walls 41.

Figure 2:
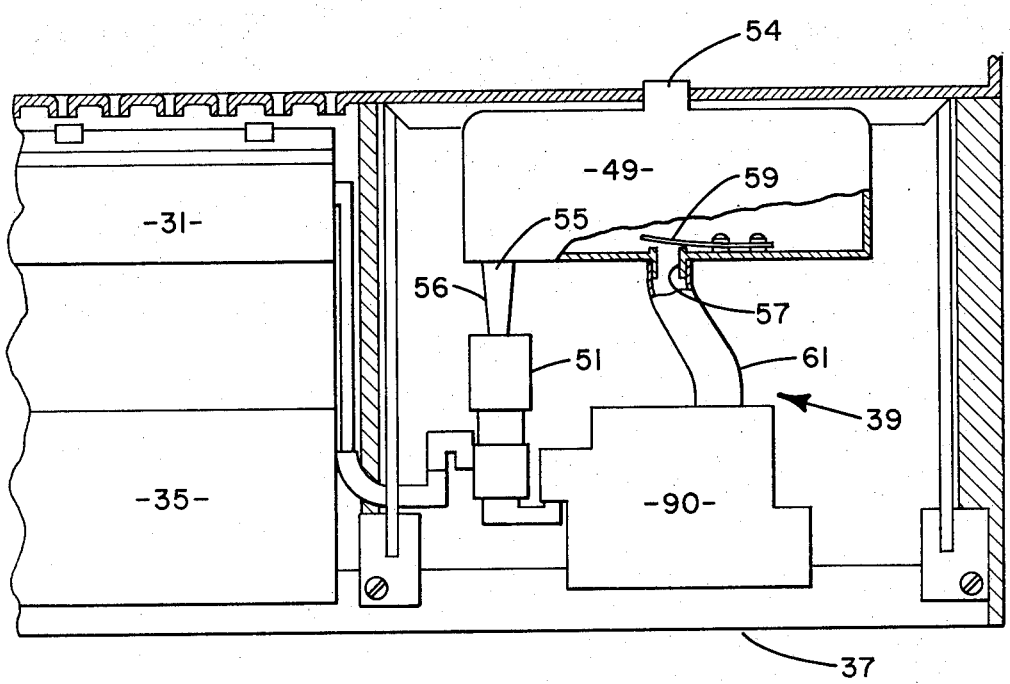
FIG. 2 is a partial side elevational view of the air conditioning unit including the present invention.

Referring now to FIG. 2, the air conditioning terminal includes a damper control module assembly including the control of the present invention. The module assembly includes convex plates 35, bladders 31 and 33, and a control module 39 mounted on triangular diffuser member 37. The control module preferably comprises filter means 49, a pressure responsive valve or pressure regulator 51, and thermostat 90. Filter 49 is provided with an opening 54 in a top surface thereof for communication with primary chamber 19. Filter 49 further includes a first, normally opened port 55, disposed in the lower surface thereof. Filtered air from filter 49 is supplied through normally opened port 55 and duct 56 to pressure regulator 51. Filter 49 further includes a second normally closed port 57 disposed in the lower surface thereof. A bimetallic member 59 is movably positioned over port 57 for a reason to be more fully explained hereinafter. Filtered air from filter 49 is supplied to thermostat 90 via port 57 and duct 61 when the bimetallic member 59 moves so as to open port 57, as is illustrated in FIG. 2.

During normal operation, controlled air from pressure regulator 51 is supplied to thermostat 90 and to bladders 31 and 33. If it is desirable to control bladders 31 and 33 independently, the control module may be provided with two filters, two regulators, and two thermostats. This may be desirable when the air terminal is disposed above a room partition for individual temperature control on either side of the partition. Preferably, pressure regulator 51 is of a type disclosed in U.S. Pat. No. 3,434,409, issued Mar. 25, 1969, in the name of Daniel A. Fragnito. Reference may be made to such patent for a complete description of the pressure regulator or valve. Preferably, thermostat 90 is of a type disclosed in U.S. Pat. No. 3,595,475, issued in the name of Daniel Morton. Reference may be made to such patent for a complete description of the thermostat.

Generally, the air supplied from the central air conditioning apparatus via duct 17 is at a relatively low temperature level to cool the spaces or rooms in the building to desired temperature levels in accordance with the preferences of the individual occupants of such areas. The relatively cold conditioned air compensates for heat developed in such areas by one or more of the following: lights, electric machinery, people, and solar heat introduced as a result of radiation and conduction.

During the evening hours in many buildings employing the air conditioning units hereinbefore described, the rooms or areas are unoccupied, the machinery is inoperative, and the lights are off. Thus, although the thermostats operate to reduce the quantity of air discharged from the units to a minimum, generally, the controls for the air conditioning units of the type described, are unable to entirely stop the flow of conditioned air into the spaces or rooms served by such units. Thus, the continual, minimal flow of conditioned air may eventually reduce the temperature in such areas to an undesirably low temperature level. When such areas are reoccupied the following day, some occupants thereof may be uncomfortable as a result of such relatively low temperature levels. Overcooling may also result during the time when the spaces are unoccupied for prolonged periods of time for example during the weekend, and the central refrigeration plant is shut down. Such overcooling results from transmission losses to the outside through the skin of the building.

To overcome the foregoing, it has been the practice in many applications to provide relatively warm air from a central air conditioning apparatus to the unit prior to the arrival of the occupants. A separate warm-up switch has been heretofore required to sense the supply of relatively warm air and to provide a control signal to the unit thermostat, to cause the thermostat to function as if the temperature of the space being served by such unit were at a relatively high temperature level. Thus, the control signal thereafter provided from the pressure regulator is of a magnitude solely dependent upon the supply air pressure so that a maximum quantity of air is discharged from the unit. The temperature level of the various spaces is raised to a desired value within a minimum amount of time. Thereafter, the central air conditioning apparatus again provides relatively cold air, and the units return to their normal operating mode. Although the foregoing has provided increased comfort for occupants of areas served by such units, the cost of providing the additional warm-up control has decreased the number of installations utilizing the device.

As noted hereinbefore, during normal operation, that is, when the supply of conditioned air is at a relatively low temperature level, the air is delivered through filter means 49 to pressure regulator 51. During such times, port 57 is closed as a result of bimetallic member 59 being positioned thereover. The control signal from pressure regulator 51 to inflatable bladders 31 and 33 is thus dependent upon the pressure of the supply air and the temperature of the space served by the units as sensed by thermostat 90.

When the temperature of the air supplied through duct 17 is at a relatively high temperature level to warm the areas served by the units, the air passing through filter means 49 causes bimetallic member 59 to open port 57 to pass the relatively warm air through conduit 61 to thermostat 90. This, in effect, results in the thermostat functioning as if the temperature of the area served by the unit were at a relatively high temperature level. Thus, the control signal supplied from pressure regulator 51 to inflatable bladders 31 and 33 when the temperature of the air supplied via duct 17 is at a relatively warm temperature level is solely dependent upon the pressure of such air. By including the control of the present invention, the requirement for a separate warm-up switch is eliminated, thus reducing the cost of providing an air conditioning unit including the warm-up feature.

It should be specifically understood that, although the present invention has been illustrated as embodied in a ceiling air conditioning terminal, it should be understood that the invention may be employed with other types of air conditioning units serving areas or rooms wherein the temperature level may become uncomfortably cold during certain periods of time.

While a preferred embodiment of the present invention has been described and illustrated, the invention should not be limited thereto, but may be otherwise embodied with the scope of the following claims.

I claim:

1. A control for an air conditioning unit operable to supply air conditioned to a relatively low temperature level at a contral station to an area, said central station being connected to said air conditioning unit through a supply duct, said unit including means to regulate the quantity of air discharged from said unit, said control comprising:
   a. a pressure responsive valve connected to said air regulating means;
   b. means connecting said pressure responsive valve to said supply duct, a portion of said conditioned air passing through said pressure responsive valve to provide a control signal to said air regulating means, the magnitude of said control signal varying directly with changes in pressure of said conditioned air in said supply duct;
   c. thermostatic means for sensing the temperature of said air in said area being conditioned and for further varying the magnitude of said control signal supplied to said air regulating means, the magnitude of said signal increasing as the temperature of said area approaches a predetermined value to decrease the quantity of conditioned air supplied from said unit to said area; and
   d. said connecting means including a port having a temperature responsive element provided thereover to normally close said port, means connecting said port to said thermostat means, said temperature responsive element opening said port when the temperature of said conditioned air supplied from said central station exceeds a predetermined value, said relatively warm air passing through said port to said thermostatic means, said thermostatic means thereby decreasing the magnitude of the control signal from said pressure responsive valve to said air regulating means to a value as determined solely by the pressure of said conditioned air in said supply duct.

2. A control for an air conditioning unit operable to supply air conditioned to a relatively low temperature level at a central station into an area, said central station being connected to said air conditioning unit through a supply duct, said unit including means to regulate the quantity of air discharged from said unit, said control comprising:
   a. a pressure responsive valve connected to said air regulating means;
   b. means connecting said pressure responsive valve to said supply duct to pass a portion of said conditioned air to said pressure responsive valve to provide a control signal to said air regulating means, the magnitude of said control signal varying with changes in pressure of said conditioned air in said supply duct to maintain the quantity of air discharged substantially constant;
   c. thermostatic means for sensing the temperature of said air in said area being conditioned and for further varying the magnitude of said control signal supplied to said air regulating means to reduce the quantity of air discharged from the unit as the temperature in said area approaches a predetermined value; and d. said means connecting said pressure responsive valve to said supply duct including a member having a normally open port, conditioned air passing therethrough to said pressure responsive valve, and a normally closed port connected to said thermostatic means, said normally closed port being open when the temperature of said air supplied from said central station exceeds a predetermined value to pass said relatively warm air to said thermostatic means, said thermostatic means thereby becoming ineffective to vary the magnitude of the control signal from said pressure responsive valve to said air regulating means, the magnitude of said signal being determined solely by the pressure of said conditioned air in said supply duct.

3. A control in accordance with claim 2 wherein said means connecting said pressure responsive valve to said supply duct includes a filter member.

4. A control in accordance with claim 3 wherein said ports are provided in said filter member.

5. A control in accordance with claim 4 wherein said normally closed port has a bimetallic member movably disposed thereover, said bimetallic member opening said port when supply air temperature exceeds a predetermined value.

6. A control in accordance with claim 2 wherein said normally closed port has a bimetallic member movably disposed thereover, said bimetallic member opening said port when said supply air temperature exceeds a predetermined value.

7. An air conditioning unit for supplying conditioned air into a space to be conditioned, the air being cooled to a relatively low temperature level at a central station, said central station being connected to said air conditioning unit through a supply duct, said unit comprising:

a. means to regulate the quantity of air discharged from said unit;

b. a pressure responsive valve connected to said air regulating means and said supply duct to provide a control signal to said air regulating means, the magnitude of said control signal varying with changes in pressure of said conditioned air in said supply duct;

c. thermostatic means for sensing the temperature of said air in said area being conditioned and for further varying the magnitude of said control signal supplied to said air regulating means, the magnitude of said control signal approaching a value so the air regulating means decreases the quantity of conditioned air supplied from said unit into said area as the temperature of said area approaches a predetermined value; and d. means connected to said thermostatic means and said pressure responsive means, said means including a normally open port through which conditioned air passes from said supply duct to said pressure responsive valve and a normally closed port communicating with said thermostatic means, said normally closed port opening when the temperature of said conditioned air supplied from said central station through said supply duct exceeds a predetermined value, said relatively warm air passing through said port to said thermostatic means, said thermostatic means thereby becoming ineffective to vary the magnitude of the control signal from said pressure responsive valve to said air regulating means, the magnitude of said signal being determined solely by the pressure of said conditioned air in said supply duct.

8. An air conditioning unit in accordance with claim 7 wherein said means having a normally closed port includes filter means.

9. An air conditioned unit in accordance with claim 8 wherein said normally closed port has a bimetallic element disposed thereover, said bimetallic element moving to open the port when the temperature of the air in the supply duct exceeds a predetermined value.

10. An air conditioning unit in accordance with claim 7 wherein said normally closed port has a bimetallic element disposed thereover, said bimetallic elements moving to open the port when the temperature of the air in the supply duct exceeds a predetermined value.

* * * * *